(12) United States Patent
Choudhury et al.

(10) Patent No.: US 11,336,895 B2
(45) Date of Patent: May 17, 2022

(54) TONE-CURVE OPTIMIZATION METHOD AND ASSOCIATED VIDEO ENCODER AND VIDEO DECODER

(71) Applicant: Dolby Laboratories Licensing Corporation, San Francisco, CA (US)

(72) Inventors: Anustup Kumar Atanu Choudhury, Campbell, CA (US); Robin Atkins, San Jose, CA (US); Thaddeus Beier, Lafayette, CA (US); Ali Zandifar, Los Angeles, CA (US); Ian Godin, Santa Clarita, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/640,332

(22) PCT Filed: Sep. 5, 2018

(86) PCT No.: PCT/US2018/049585
§ 371 (c)(1),
(2) Date: Feb. 19, 2020

(87) PCT Pub. No.: WO2019/050972
PCT Pub. Date: Mar. 14, 2019

(65) Prior Publication Data
US 2021/0076042 A1    Mar. 11, 2021

Related U.S. Application Data

(60) Provisional application No. 62/720,411, filed on Aug. 21, 2018, provisional application No. 62/633,326, (Continued)

(30) Foreign Application Priority Data

Sep. 6, 2017 (EP) .................................. 17189603

(51) Int. Cl.
*H04N 19/136* (2014.01)
*H04N 19/186* (2014.01)
*H04N 19/70* (2014.01)

(52) U.S. Cl.
CPC ......... *H04N 19/136* (2014.11); *H04N 19/186* (2014.11); *H04N 19/70* (2014.11)

(58) Field of Classification Search
CPC .......................... H04N 19/136; H04N 19/186
See application file for complete search history.

(56) References Cited

U.S. PATENT DOCUMENTS 8,040,397 B2   10/2011  Fujino
9,319,652 B2    4/2016  Atkins
(Continued)

FOREIGN PATENT DOCUMENTS

CN   107005720 B   8/2017
CN   107077726 B   8/2017
(Continued)

OTHER PUBLICATIONS

Bonneel, N. "Example-Based Video Color Grading" ACM Transactions, vol. 32, No. 4, p. 39, Jul. 2013.
(Continued)

*Primary Examiner* — Jerry T Jean Baptiste (57) ABSTRACT

A method for generating metadata for use by a video decoder for displaying video content encoded by a video encoder includes: (1) accessing a target tone mapping curve; (2) accessing a decoder tone curve corresponding to a tone curve used by the video decoder for tone mapping the video content; (3) generating a plurality of parameters of a trim-pass function used by the video decoder to apply after applying the decoder tone curve to the video content, wherein the parameters of the trim-pass function are generated to approximate the target tone curve with the combi-
(Continued)

nation of the trim-pass function and the decoder tone curve, and (4) generating the metadata for use by the video decoder, including said plurality of parameters of the trim-pass function.

8 Claims, 6 Drawing Sheets

Related U.S. Application Data filed on Feb. 21, 2018, provisional application No. 62/554,706, filed on Sep. 6, 2017.

(56) References Cited

U.S. PATENT DOCUMENTS

| | | |
|---|---|---|
| 9,532,022 B2 | 12/2016 | Longhurst |
| 9,554,020 B2 | 1/2017 | Thurston, III |
| 10,015,505 B2 | 7/2018 | Hattori |
| 2014/0185930 A1 | 7/2014 | Su |
| 2015/0103091 A1 | 4/2015 | Messmer |
| 2016/0071484 A1 | 3/2016 | Ballestad |
| 2016/0155243 A1 | 6/2016 | Bordes |
| 2016/0248939 A1* | 8/2016 | Thurston, III ......... H04N 1/603 |
| 2016/0316187 A1 | 10/2016 | Kitajima |
| 2016/0366444 A1 | 12/2016 | Sullivan |
| 2017/0025074 A1 | 1/2017 | Farrell |
| 2017/0078706 A1* | 3/2017 | Van Der Vleuten ... H04N 19/46 |
| 2017/0161882 A1* | 6/2017 | Mantiuk ................ A61B 3/024 |
| 2017/0214917 A1 | 7/2017 | Jia |

FOREIGN PATENT DOCUMENTS

| | | |
|---|---|---|
| JP | 2016538736 A | 12/2016 |
| WO | 2012125802 | 9/2012 |
| WO | 2017053620 | 3/2017 |
| WO | 2018017830 | 1/2018 |

OTHER PUBLICATIONS

Fradarique Dufaux et al: 11 High Dynamic Range Video : Acquisition, Display and Applications 11 In: 11 Elsevier Science & Technology, 2016 11 Jan. 1, 2016, pp. 277-280.

Francois, E. et al Signalling,, Backward Compatibility, and Display Adaptation for HDR/WCG Video (Draft 2), JCT-VC Meeting; Dec. 1, 2017-Jan. 20, 2017; Geneva; (Joint Collaborative Team on Video Coding of ISO/IEC JTC1/SC29/WG11 and ITU-T SG 16.

Lu, T. et al "AHG7: On Content Colour Volume SEI Message", JCT-VC Meeting, Joint Collaborative Team on Video Coding of ISO/IEC JTC1/SC29/WG11 and ITU-T SG.16, Jan. 2017.

Mantiuk, R. et al "Display Adaptive Tone Mapping" ACM Siggraph, Aug. 1, 2008, pp. 1-10.

MPEG: "Dynamic Metadata for Color Volume Transform—Application #1", SMPTE ST 2094-10:2016, vol. 18, Jan. 1, 2016, pp. 1-15.

SMPTE "ST 2094-20:2016 Dynamic Metadata for Color Volume Transform—Application #2 Table of Contents", IEEE, Jul. 21, 2016 (Jul. 21, 2016), pp. 1-23.

SMPTE: "Dynamic Metadata for Color Volume Transform—Application #3", IEEE, Jul. 21, 2016 (Jul. 21, 2016), pp. 1-15.

Smpte: "ST 2094-1:2016—SMPTE Standard—Dynamic Metadata for Color Volume Transform—Core Components", IEEE, Jun. 13, 2016, pp. 1-15.

Smpte: 11 Dynamic Metadata for Color Volume Transform—Application #4 Table of Contents 11, IEEE, Jan. 1, 2016, pp. 1-26.

Yeung, R. et al "Indication of SMPTE 2094-10 Metadata in HEVC", Joint collaborative Team on Video Coding of ISO/IEC JTC1/SC29/WG11 and ITU-T SG.16, May 26, 2016-Jun. 1, 2016.

* cited by examiner

TONE-CURVE OPTIMIZATION METHOD AND ASSOCIATED VIDEO ENCODER AND VIDEO DECODER

CROSS REFERENCE TO RELATED APPLICATIONS

This application may be related to U.S. Provisional Patent Application Ser. No. 62/554,706, and European Patent Application 17189603.8, both filed on 6 Sep. 2017; U.S. Provisional Patent Application Ser. No. 62/633,326 filed 21 Feb. 2018; and U.S. Provisional Patent Application Ser. No. 62/720,411, filed on 21 Aug. 2018, each incorporated herein by reference in its entirety.

TECHNOLOGY

The present invention relates generally to images. More particularly, an embodiment of the present invention relates to tone-curve optimization in video encoding and decoding.

BACKGROUND

As used herein, the term dynamic range may relate to a capability of the human visual system to perceive a range of intensity (e.g., luminance, luma) in an image, e.g., from darkest blacks (darks) to brightest whites (highlights). In this sense, dynamic range relates to a 'scene-referred' intensity. Dynamic range may also relate to the ability of a display device to adequately or approximately render an intensity range of a particular breadth. In this sense, dynamic range relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a dynamic range breadth that spans the some 14-15 orders of magnitude of the human visual system. In practice, the dynamic range over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the dynamic range that is simultaneously perceivable by a human visual system. As used herein, EDR may relate to a dynamic range that spans five to six orders of magnitude. Thus, while perhaps somewhat narrower in relation to true scene referred HDR, EDR nonetheless represents a wide dynamic range breadth and may also be referred to as HDR.

In practice, images comprise one or more color components (e.g., luma Y and chroma Cb and Cr) wherein each color component is represented by a precision of n-bits per pixel (e.g., n=S). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support a luminance of 200 to 300 $cd/m^2$ or nits. Most consumer HDTVs range from 300 to 1000 $cd/m^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more).

As used herein, the term "display management" includes, but is not limited to, the processing (e.g., tone and gamut mapping) required to map an input video signal of a first dynamic range (e.g., one thousand nits) to a display of a second dynamic range (e.g., five hundred nits).

DETAILED DESCRIPTION OF THE EMBODIMENTS

The methods of the present disclosure relate to any dynamic range higher than SDR. Improved techniques for the display management of high-dynamic range images onto HDR and SDR displays are desirable for both backward compatibility and a superior immersive experience.

Figure 1:
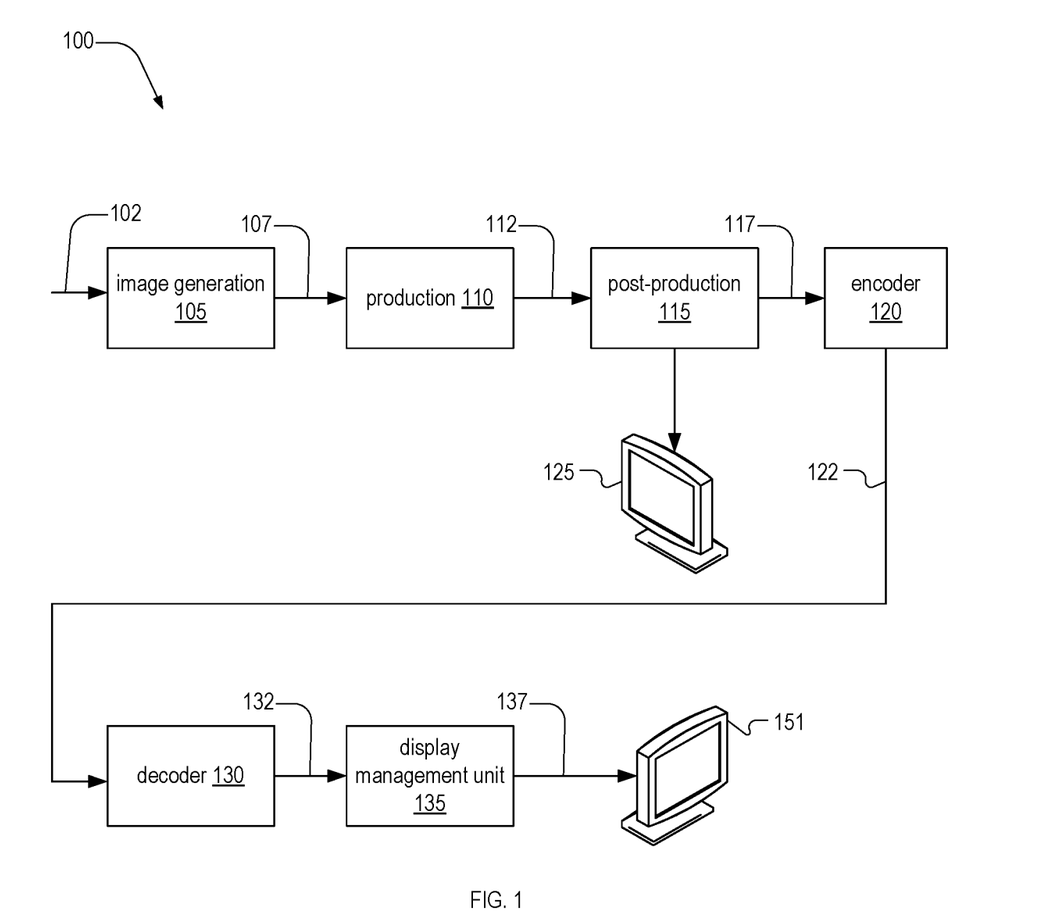
FIG. 1 depicts a video delivery pipeline that includes an encoder and a decoder, in an embodiment.

FIG. 1 depicts an example process of a video delivery pipeline 100 showing various stages from video capture to video content display. A sequence of video frames 102 is captured or generated using image generation block 105. Video frames 102 may be digitally captured (e.g. by a digital camera) or generated by a computer (e.g. using computer animation) to provide video data 107. Alternatively, video frames 102 may be captured on film by a film camera, in which case the film is converted to a digital format to provide video data 107. In a production phase 110, video data 107 is edited to provide a video production stream 112.

The video data of video production stream 112 is then provided to a processor at a post-production block 115 for post-production editing. Editing at post-production block 115 may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production block 115 to yield a final version 117 of the production for distribution. During post-production editing of post-production block 115, video images are viewed on a reference display 125.

Following post-production at post-production block 115, video data of final version 117 may be delivered to an encoder 120 for delivering downstream to decoding and playback devices such as television sets, set-top boxes, movie theaters, and the like. In some embodiments, encoder 120 may include audio and video encoders, such as those defined by ATSC, DVB, DVD, Blu-Ray, and other delivery formats, to generate a coded bit stream 122. In a receiver, coded bit stream 122 is decoded by a decoder 130 to generate a decoded signal 132 representing an identical or close approximation of the video data corresponding to final version 117. The receiver may be attached to a target display 151, which may have completely different characteristics from reference display 125. In that case, a display management unit 135 may be used to map the dynamic range of decoded signal 132 to the characteristics of the target display 151 by generating display-mapped signal 137. Target display 151 may be a reference monitor, computer monitor or display, a television set, a head-mounted display, a virtual retinal display, or the like.

Figure 2:
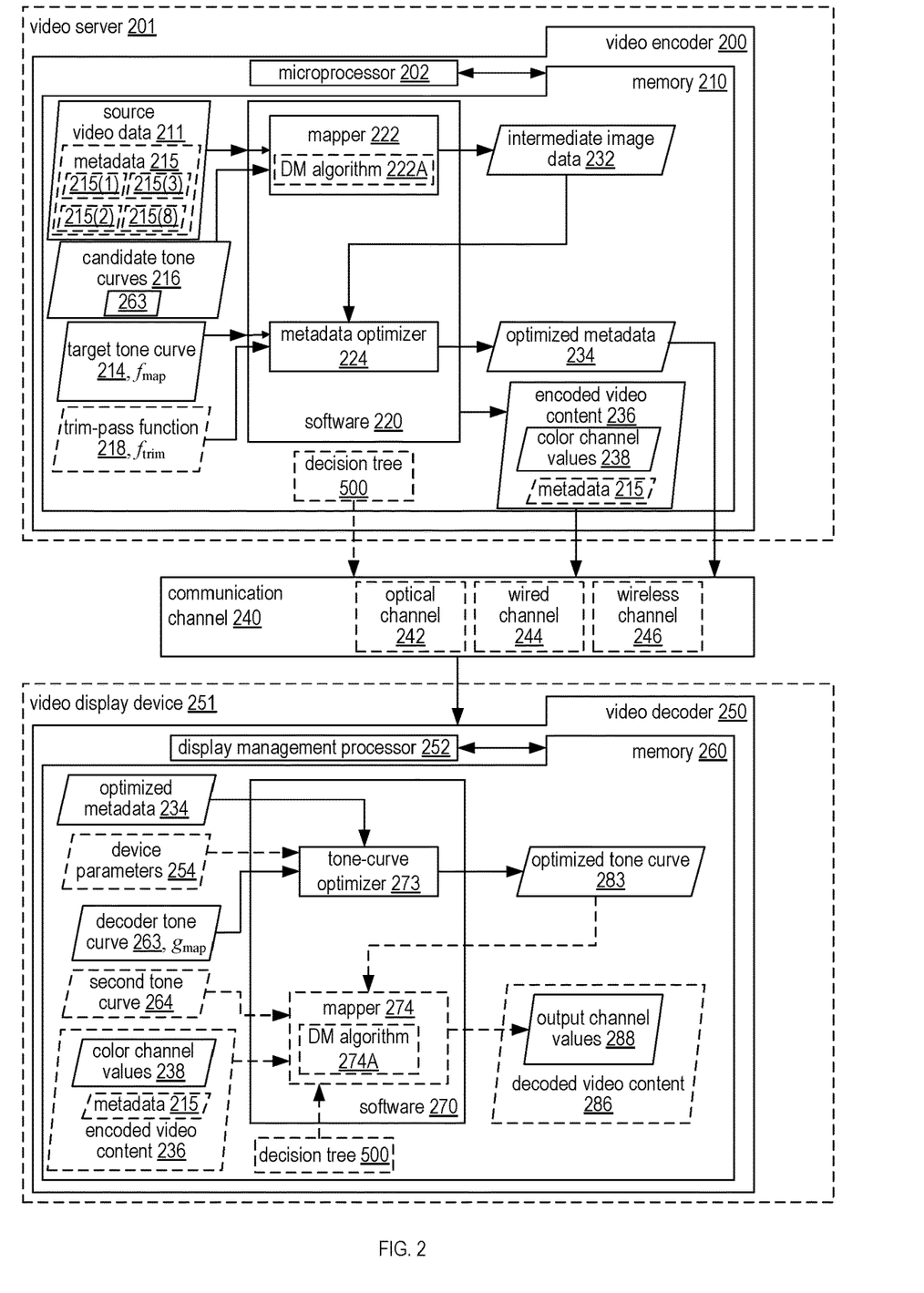
FIG. 2 is a schematic block diagram of a video encoder and a video decoder configured to implement a tone-curve optimization method, in an embodiment.

FIG. 2 is a schematic block diagram of a video encoder 200 and a video decoder 250 in an example use scenario. Video encoder 200 and video decoder 250 are examples of encoder 120 and decoder 130, respectively. In this scenario, video encoder 200 is communicatively connected to video decoder 250 via a communication channel 240. Video encoder 200 and video decoder 250 may be part of a video server 201 and a video display device 251, respectively. Video decoder 250 may include functionality of display management unit 135. Communication channel 240 may include at least one of an optical channel 242, a wired channel 244, and a wireless channel 246. Video display device 251 is an example of target display 151.

Video encoder 200 includes a microprocessor 202 communicatively coupled to a memory 210, configured to store a target tone curve 214, source video data 211, candidate tone curves 216, software 220, intermediate image data 232, optimized metadata 234, and encoded video content 236. Memory 210 may also store a trim-pass function 218. Software 220 includes a mapper 222, and a metadata optimizer 224. Mapper 222 may implement a display-management algorithm 222A, which maps an input video signal of a first dynamic range to a video signal having a second dynamic range. Microprocessor 202 performs functions of video encoder 200 described herein when executing machine-readable instructions of software 220.

While the term of art for tone curves described herein is tone mapping curve, tone curve is used for sake of brevity. Herein, the term display management curve is equivalent to a tone mapping curve.

Encoded video content 236 includes a plurality of color channel values 238, and may be digital video content encoded per a video coding format. Candidate video coding formats include, and are not limited to, MPEG-2, MPEG-4, H.264, AVC, HEVC, and others known the current or future state of the art.

Video decoder 250 includes a display management processor 252 communicatively coupled to a memory 260, configured to store optimized metadata 234, a decoder tone curve 263, and software 270. Memory 260 may also be configured to store a second tone curve 264 and decoded video content 286, which includes output channel values 288. Decoded video content 286 is an example of display-mapped signal 137 (FIG. 1). Display management processor 252 may be a microprocessor, and performs functions of video decoder 250 described herein when executing machine-readable instructions of software 270.

Second tone curve 264 may be similar to target tone curve 214. For example, target tone curve 214 and second tone curve 264 may at least one of: be compatible with the same metadata, have a same functional form, and be equal. Tone curves 214 and 264 may have the same dynamic range or may have different dynamic ranges. Decoder tone curve 263 may have a dynamic range equal to or different from one or both of tone curves 214 and 264.

A tone curve, such as tone curves 214, 263, and 264 may be stored in one or both of memory 210 and memory 260 in different formats. These formats include a data table, polynomial coefficients, spline anchor points and lines/curves therebetween, and combinations thereof.

Decoder tone curve 263 may represent mapping function $g_{map}$, as shown in FIG. 2. Decoder tone curve 263 is one of candidate tone curves 216 stored in memory 210 of video encoder 200. Software 270 includes a tone-curve optimizer 273 and may also include a mapper 274. Software 270 performs functions of video decoder 250 described herein when executing machine-readable instructions of software 270. Mapper 274 may implement a display-management algorithm 274A, which maps an input video signal of a first dynamic range to a video signal having a second dynamic range.

Each of memory 210 and memory 260 may be transitory and/or non-transitory and may include one or both of volatile memory (e.g., SRAM, DRAM, or any combination thereof) and nonvolatile memory (e.g., FLASH, ROM, magnetic media, optical media, or any combination thereof). Part or all of memory 210 may be integrated into microprocessor 202. Part or all of memory 260 may be integrated into display management microprocessor 252.

Source video data 211 includes digital images characterized by pixels each having a color defined by one or more color components, or channel values. Each channel value $X_i$ has an N-bit precision, e.g., N=8 such that $X_i \in [0,255]$. The channel values may correspond to those of a color space. The specific color space is, for example, based on one of the following color spaces: CIE, RGB, YUV, HSL/HSV, and CMYK. Channel value $X_i$ may represent luminance, for example, in a YUV color space. Target tone curve 214 may represent mapping function $f_{map}$ of channel values $X_i$, as shown in FIG. 2.

Source video data 211 and encoded video content 236 may include source metadata 215. Source metadata 215 may comply with Application Constraints on metadata described in SMPTE Standard 2094-10:2016, *Dynamic Metadata for Color Volume Transform-Application #1*, (© 2016, Society of Motion Picture and Television Engineers). Source metadata 215 may include at least one of L1 metadata 215(1), L2 metadata 215(2), L3 metadata 215(3), and L8 metadata 215(8). Each of target tone curve 214, decoder tone curve 263, and second tone curve 264 may be compatible with, or at least partly determined by, at least one of metadata 215(1), 215(2), 215(3), and 215(8). Display-management algorithms 222A and 274A may be compatible with the same metadata 215, or be compatible with different metadata 215.

In a first embodiment, display-management algorithm 222A is compatible with metadata 215(3) and 215(8) and display management algorithm 274A is compatible with 215(2). In a second embodiment, both display-management algorithms 222A and 274A are compatible with metadata 215(3) and 215(8). In the second embodiment, display management algorithm 274A may also be compatible with metadata 215(2).

L1 metadata 215(1) provides/describes information about the dynamic range of the content, such as the distribution of luminance values in a source image, a source scene, a source gain/offset/power, etc., as represented in the source video data 211. In some embodiments, the distribution of luminance values may be represented by histograms derived based on image content (e.g., pixel values, luma values, chroma values, Y values, Cb/Cr values, RGB values, etc.) of the image, the scene, the gain/offset/power, etc. L1 metadata 215 (1) may include quantities min, mid, and max representing, respectively, minimum ("crush"), mid-tone ("mid"), and maximum ("clip") luminance values representative of one or more scenes of source video data 211.

Decoder tone curve 263 is a mapping between an input channel value $X_i$ (a.k.a., an "input intensity") and an intermediate channel value $Y_i = g_{map}(X_i)$. For example, mapper 222 may employ decoder tone curve 263 to map input channel values of source video data 211 to intermediate image data 232. Mapping function $g_{map}$ may be a function of $X_i$ and L1 metadata 215(1). For example, $$g_{map}(X_i) = \left(\frac{C_1 + C_2 X_i^n}{1 + C_3 X_i^n}\right)^m, \qquad (1)$$

where m is a parameter that determines steepness of $g_{map}$ at mid-tone luminance values between low and high luminance values, and the $C_i$ parameters can be generated based on L1 metadata in the source (e.g., min, mid, and max luminance values) and the corresponding luminance characteristics of the target display.

L2 metadata 215(2) provides and/or describes information about video characteristic adjustments that are originated from, or traced back to, adjustments made by a director, a color grader, a video professional, etc., in a production studio with reference display 125 with a reference dynamic range. L8 metadata 215(8) is similar to L2 metadata 215(2), e.g., L8 metadata 215(8) may be equivalent to L2 metadata 215(2) when one of tone curves 263 and 264 matches target tone curve 214. In another embodiment, L2 metadata may refer to trim-pass metadata using a first tone-mapping curve (for example, a tone curve used in version 1 of a display management process) and L8 metadata may refer to trim-pass metadata using a second tone-mapping curve (e.g., a tone curve used in version 2 or later of a display management process.)

L3 metadata 215(3) provides and/or describes information about video characteristic adjustments that are originated from, and/or traced back to, adjustments made by a director, a color grader, a video professional, etc., in a production studio with a second reference display, such as target display 151, with a second reference dynamic range different from the reference dynamic range of reference display 125. L3 metadata 215(3) includes, for example, offsets or adjustments from L1 metadata 215(1), such as Δmin, Δmid, and Δmax which are offsets from quantities min, mid, and max, respectively.

Trim-pass function 218 may represent a trim-pass function $f_{trim}$, as shown in FIG. 2. Trim-pass function $f_{trim}$ may be a function of metadata such as S, O, and P, which represent slope, offset, and power respectively. Metadata S, O, and P are each examples of L2 metadata 215(2), Metadata values S, O, and P are also called "trim-pass values" herein. For example, $f_{trim}(Y_i) = (S \cdot Y_i + O)^P$. Trim-pass values S, O, and P may be optimized to minimize an expression $$M_{S,O,P} = \Sigma_{i=1}^{n} |f_{map}(X_i) - (S \cdot (g_{map}(X_i)) + O)^P|^m, \qquad (2)$$

where m>0. Trim-pass function $f_{trim}$ may have other functional forms, such as power-law expression $f_{trim}(Y_i) = S \cdot Y_i^P + O$, where exponent P is analogous to exponent γ in gamma encoding known in the art of encoding and decoding luminance or tristimulus values. Optimized trim-pass values S, O, and P are examples of optimized metadata 234 stored in video encoder 200. In another example embodiment, the trim-pass function may be expressed in terms of lift, gain, and gamma parameters (LGG). For example, in an embodiment, $f_{trim}(Y_i) = (Gain*(Y_i + Lift*(1-Y_i)))^{1/gamma}$.

Given metadata in terms of lift, gamma, and gain, those values can be converted back to SOP values. For example, in an embodiment, the following transformations may be used:

$$S = \left(\frac{\text{gain}}{2.0} + 1.0\right) * \left(1 - \frac{\text{lift}}{2.0}\right) - 1.0, \qquad (3)$$

$$O = \left(\frac{\text{gain}}{2.0} + 1.0\right) * \left(\frac{\text{lift}}{2.0}\right),$$

$$\text{gamma} = \text{clamp}(\text{gamma}, -1.0, 1.0),$$

$$P = \frac{1.0}{\frac{\text{gamma}}{2.0} + 1.0} - 1.0,$$

$$P = \text{clamp}(P, -0.5, 0.5),$$

where y=clamp(x, $x_{min}$, $x_{max}$) constrains (clamps) the value of x to be between $x_{min}$ and $x_{max}$. That is, if (x<$x_{min}$), then y=$x_{min}$ and if (x>$x_{max}$), then y=$x_{max}$.

Equation (2), describes a multi-parameter optimization across all three parameters of the trim-pass function (e.g., S, O. and P). Such an optimization may yield mappings that are discontinuous, which yield tone-mapped images that are not aesthetically pleasing. In an embodiment, one may fix one of the three parameters based on some suitable function, and then optimize equation (2) across the remaining two parameters. For example, consider a scenario of converting tone curves determined using L8 metadata and L2 metadata using Lift, Gain, and Gamma values. Then, solving equation (2) using SOP metadata may include the following steps:

a) Generate L8 Power ($P_{L8}$) metadata from L8 Gamma data $P_{L8} = 1/\text{gamma}_{L8}$, b) Convert L8 Power to L2 Power if ($P_{L8}$<0) then $$P_{L2} = 2*P_{L8} + P_{L8}^2$$

else $$P_{L2} = 2*P_{L8} - P_{L8}^2 \qquad (4)$$

c) For the given $P_{L2}$ values, find optimum $S_{L2}$ and $O_{L2}$ values by minimizing equation (2) across S and O.

Note that in an embodiment, without loss of generality, the above computations may assume that lift, gain, and gamma values are in [−1, 1], while SOP values may be in [−0.5, 0.5]. Furthermore, in an embodiment, L2 and L8 metadata may be scaled differently in encoded bitstreams, thus, they may need to be appropriately rescaled. For example, in an embodiment, before using SOP values in equation (2):

$$S = S_{L2} + 1,$$

$$O = O_{L2},$$

$P=P_{L2}+1$, and $S=2*S_{L8}+1$, $O=2*O_{L8}$, $P=2*P_{L8}+1$.

wherein $S_{L2}$, $O_{L2}$, $P_{L2}$ denote L2 SOP metadata and $S_{L8}$, $O_{L8}$, $P_{L8}$ denote L8 SOP metadata.

In some embodiments, optimization in equation (2) may be performed based on just two pairs of data points, one close to the minimum luminance value of the input (xmin) and one close to the maximum luminance value of the input (xmax). Let Tmin and Tmax denote the minimum and maximum brightness of the target display (see FIG. 3B). As depicted in FIG. 3B, as an example and without limitation, given two tone-mapping curves (e.g., $f_{map}(\ )$ 350 and $g_{map}(\ )$ 360) with the task to adjust the decoder tone-mapping curve (360) so it matches the target tone-mapping curve (350), two optimization points may determined a) (x1, Tmin), where x1≥xmin and x1 denotes the $x_i$ value where one of the curves (preferably $f_{map}(\ )$) crosses Tmin and b) (x2, Tmax), where x2≤xmax and x2 denotes the $x_i$ value where one of the curves (preferably $f_{map}(\ )$) crosses Tmax. Given the difference in values between the two curves in these two points (e.g., $d1=f_{map}(x1)-g_{map}(x1)$ and $d2=f_{map}(x2)-g_{map}(x2)$), from equation (2), S, O, P parameters may be determined so that the total error in these two points, e.g., $$M_{S,O,P}=d1^2+d2^2 \quad (5)$$

is minimized Such an optimization of $M_{S,O,P}$ can be performed using known in the art techniques, such as Powell's method. Referring back to our previous discussion related to equation (4), one may also use a simplified, two-step, optimization method to solve equation (5) by a) determining one of the parameters (say, P) according to input metadata values (e.g., see equation (4)) and b) solving an optimizing problem to minimize $M_{S,O,P}$ in equation (5) for the other two parameters (e.g., O and S).

In an embodiment, when the tone-mapping curves do not cross Tmin or Tmax, optimization techniques may use any other x1 and x2 points within our rectangle of interest, that is the rectangle bounded by xmin, xmax, Tmin, and Tmax.

Target tone curve 214 ($f_{map}(X_i)$) may be equal to a second trim-pass function $f_{trim}'$ of a second target tone curve $f_{map}'(X_i)$:

$$f_{map}(X_i)=f_{trim}'(f_{map}'(X_i)). \quad (6)$$

For example, this relates to a scenario wherein a new tone curve—the second target tone curve—is available at an encoder, and also trim-pass values—e.g. provided by a colorist—are available for application in combination with the new tone curve. To approximate the combined operation of the new tone curve and the corresponding trim-pass values, the trim-pass values that are to be applied by the decoder after applying the decoder tone mapping can be optimized by minimizing a difference between (1) the combination of the trim-pass function and the decoder tone curve 263 ($g_{map}(X_i)$) and (2) the combination of the second trim-pass function $f_{trim}'$ and the second target tone curve $f_{map}'(X_i)$. That is, optimized metadata 234 may be optimized to minimize an expression $$\Sigma_{i=1}^n |f_{trim}'(f_{map}(X_i))-f_{trim}(g_{map}(X_i))|^k, \quad (7)$$

where k>0 and may be equal to m. For example, trim-pass values S, O, and P (as optimized metadata 234) may be optimized to minimize an expression $$N_{S,O,P}=\Sigma_{i=1}^n |f_{trim}'(f_{map}(X_i))-(S\cdot(g_{map}(X_i))+O)^P|^k. \quad (8)$$

One application of minimizing $N_{S,O,P}$ is when tone curve $f_{map}$ and its corresponding trims $f_{trim}'$ correspond to the creative intent of a colorist. One or both of $M_{S,O,P}$ and $N_{S,O,P}$ may be optimized via a simulated annealing process, e.g., to avoid local minima. Optimizations of either or both of $M_{S,O,P}$ and $N_{S,O,P}$ may be constrained by L1 metadata of source metadata 215, e.g., crush value xmin and clip value xmax, which enables optimized trim-pass values to better correspond to properties of video display device 251, such as its dynamic range.

Figure 3A:
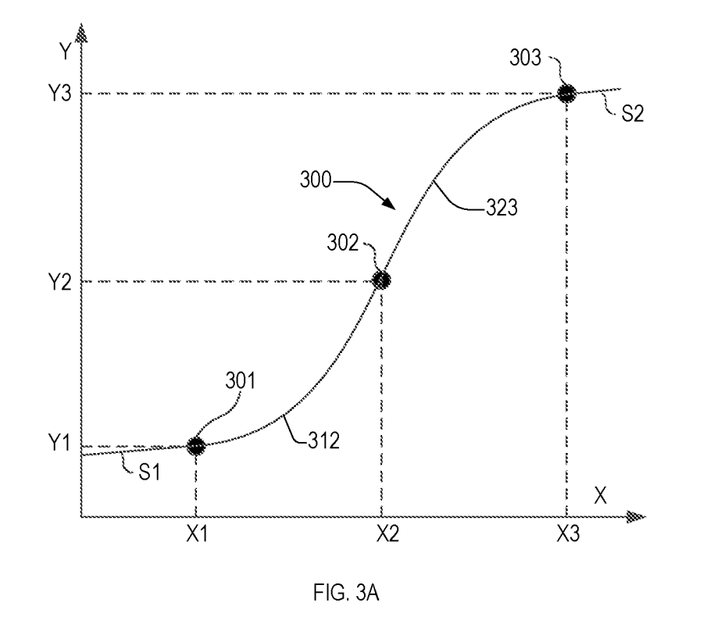
FIG. 3A is a graphical depiction of an example tone-mapping curve for mapping images from a first dynamic range to a second dynamic range according to an embodiment.
Figure 3B:
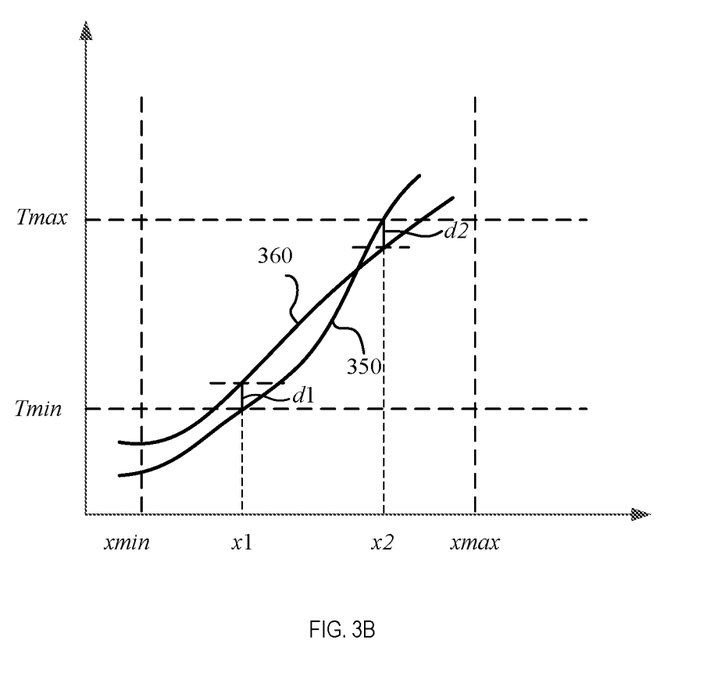
FIG. 3B depicts an example of defining parameters for improved matching of tone-mapping curves.

FIG. 3A is a graphical depiction of an example tone-mapping curve 300 for mapping images from a first dynamic range $[x_1,x_3]$ to a second dynamic range $[y_1,y_3]$, where $[x_1,x_3]$ are input channel values and $[y_1,y_3]$ are output channel values. Tone-mapping curve 300 is an example of target tone curve 214, and second tone curve 264. Tone-mapping curve 300 includes a spline 312, from $(x_1,y_1)$ to $(x_2, y_2)$, and a spline 323, from $(x_2, y_2)$ to $(x_3,y_3)$. Tone-mapping curve 300 may also include at least one of a first linear segment S1, for values lower than $(x_1, y_1)$, and a second linear segment S2, for values larger than $(x_3, y_3)$. Minimum dynamic range value $x_1$ may be negative and maximum dynamic range value $x_3$ may exceed one. Segments S1 and S2 may be non-linear, without departing from the scope hereof. Each of splines 312 and 323 may be a polynomial, such as a Hermite polynomial, or any order, such as third-order.

Tone-mapping curve 300 intersects three anchor points 301, 302, and 303, the locations of which partly determine the shape of tone-mapping curve 300. Anchor points 301, 302, and 303 are located at respective coordinates $(x_1, y_1)$, $(x_2, y_2)$, and $(x_3, y_3)$, which respectively correspond to black points (e.g., xmin, Tmin), mid-tone value points (e.g., xmid, Tmid), and white value points (e.g., xmax, Tmax) when channel values $x_i$ are input luminance values.

In addition, each of the spline segments can be further constrained by two slopes, at each end-point; thus tone-mapping curve 300 is controlled by three anchor points (301, 302, and 303) and three slopes: the tail slope at $(x_1,y_1)$, the mid-tones slope at $(x_2,y_2)$, and the head slope at $(x_3,y_3)$. Tone-mapping curve 300 may have greater than or fewer than three anchor points, and corresponding splines therebetween, without departing from the scope hereof.

As an example, consider a spline determined between points $(x_1,y_1)$ and $(x_2,y_2)$, with slope $m_1$ at $(x_1, y_1)$ and slope $m_2$ at $(x_2, y_2)$, then, for an input x the transfer function for that cubic Hermite spline may be defined in Eq. (9) below, where $T=(x-x_1)/(x_2-x_1)$;

$$y=(2T^3-3T^2+1)y_1+(T^3-2T^2+T)(x_2-x_1)m_1+(-2T^3+3T^2)y_2+(T^3-T^2)(x_2-x_1)m_2. \quad (9)$$

In an embodiment, to ensure no over- or under-shooting (that is, to ensure that the curve is monotonic), the following rule may be applied to at least one of slopes $m_1$ and $m_2$:

$$m_{1,2} \leq \alpha \frac{\Delta y}{\Delta x},$$

where $\alpha$ denotes a constant (e.g., $\alpha=3$).

The tone-mapping curve 300 may correspond to the tone-mapping curve described in international patent application PCT/US2018/017830 of the same applicant, the entire content of which is hereby incorporated by reference.

The parameters of tone-mapping curve 300, may be communicated in a video bitstream by means of L3 and/or L8 metadata. Optionally, the parameters min, mid, max are communicated by means of L1 metadata, while the parameters relating to the tail slope, mid slope and head slope are communicated using L3 and/or L8 metadata.

Figure 4:
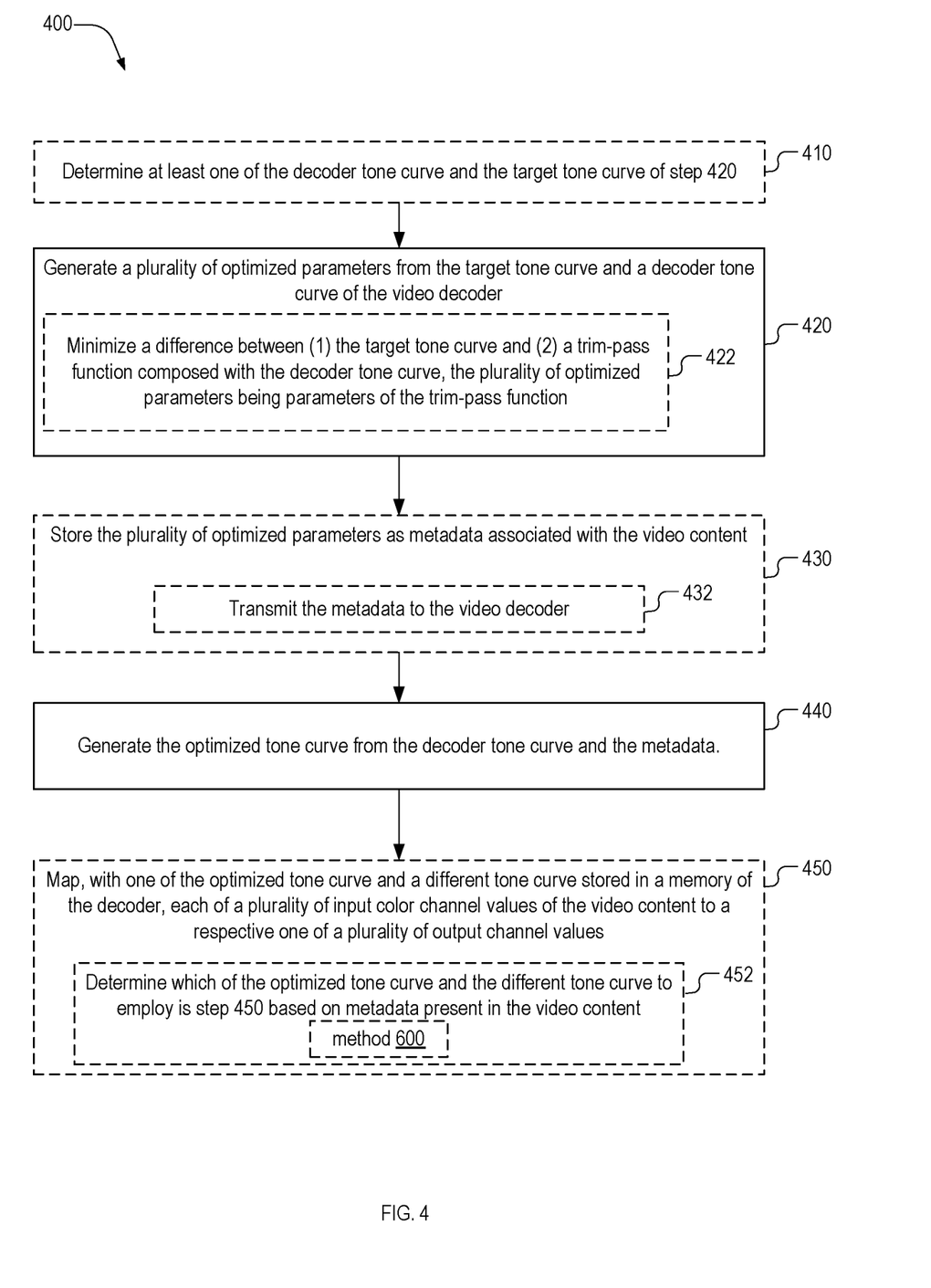
FIG. 4 is a flowchart illustrating a tone-curve optimization method, in an embodiment.

FIG. 4 is a flowchart illustrating a method 400 for generating an optimized tone curve used by a video decoder for displaying video content encoded by a video encoder. Method 400 is, for example, implemented within one or more aspects of video encoder 200 and video decoder 250. For example, method 400 is implemented by microprocessor 202 executing computer-readable instructions of software 220 and by display management processor 252 executing computer-readable instructions of software 270. Method 400 includes steps 420 and 440.

Step 420 is one of generating a plurality of optimized parameters from the target tone curve and a decoder tone curve of the video decoder. In an example of step 420, metadata optimizer 224 generates optimized metadata 234 from intermediate image data 232 and trim-pass function 218.

Method 400 may also include step 410 performed before step 420. Step 410 is one of determining at least one of the decoder tone curve and the target tone curve. In an example of step 410, video encoder 200 determines at least one of decoder tone curve 263 and target tone curve 214.

Step 420 may include a step 422, which is one of minimizing a difference between the target tone curve and a trim-pass function composed with the decoder tone curve, the plurality of optimized parameters being parameters of the trim-pass function. The step of minimizing may include executing a least-squares method, a weighted least-squares method, or damped-least squares method, such as a Levenberg-Marquardt method. The difference minimization may be constrained such that the target tone curve and the trim-pass function composed with the decoder tone curve have the same values at endpoints, e.g., at minimum and maximum values of input channel value $X_i$.

In an example of step 420, metadata optimizer 224 minimizes a difference between target tone curve 214 ($f_{map}$) and trim-pass function $f_{trim}$ of encoded channel values $g_{map}(X_i)$. That is, metadata optimizer 224 minimizes $$\Sigma_{i=1}^{n}|f_{map}(X_i)-w(X_i)\cdot f_{trim}(g_{map}(X_i))|^m, \qquad (10)$$

where weight function $w(X_i)$ depends on input channel value $X_i$ and m is positive. When m=2, metadata optimizer 224 executes a weighted least-squares method. Weight function $w(X_i)$ may be a constant function, e.g., $w(X_i)=1$. Optimized metadata 234 may include, or consist of, optimal values of S, O, and P that minimizes one or more of $M_{S,O,P}$ and $N_{S,O,P}$.

Method 400 may also include a step 430, which is one of storing the plurality of optimized parameters as metadata associated with the video content. In an example of step 430, video encoder 200 stores optimized metadata 234 in memory 210. Step 430 may include step 432, which is one of transmitting the metadata to the video decoder. In an example of step 432, video encoder 200 transmits optimized metadata 234 to video decoder 250.

Step 440 is one of generating the optimized tone curve from the decoder tone curve and the optimized parameters. In an example of step 440, tone-curve optimizer 273 generates an optimized tone curve 283 ("$f_{283}$") from optimized metadata 234 as applied to decoder tone curve 263. As expressed by equation (11) below, optimized metadata 234 ("$d_{234}$") may be optimized L2 metadata 215(2), such as optimized values of metadata S, O, and P, which tone-curve optimizer 273 applies to decoder tone curve 263 ($g_{map}$) to yield optimized tone curve 283.

$$f_{283}=f_{273}(g_{map}(X_i);d_{234})=(S\cdot g_{map}(X_i))+O)^P. \qquad (11)$$

Equation (11) states that tone-curve optimizer 273 applies a function $f_{273}$ to $f_{map}(X_i)$, where optimized metadata 234 (S, O, and P in this example) are input parameters to function $f_{273}$. Function $f_{273}$ may be equal to trim-pass function 218 used to generate optimized metadata 234. For example, the right-hand-side of equation (11) represents one form of function $f_{273}$ in which function $f_{273}=f_{trim}(Y_i)=(S\cdot Y_i+O)^P$, which is an example of trim-pass function 218.

Function $f_{273}$ may have other functional forms, and receive other types of optimized metadata 234, without departing from the scope hereof. Tone-curve optimizer 273 may also receive device parameters 254 and generate optimized tone curve 283 from L2 optimized metadata 234, decoder tone curve 263, and device parameters 254.

Method 400 may also include a step 450, which is one of mapping, with one of the optimized tone curve and a different tone curve stored in a memory of the decoder, each of a plurality of input color channel values of the video content to a respective one of a plurality of output channel values. In an example of step 450, mapper 274 maps, with one of optimized tone curve 283 and second tone curve 264, each of the plurality of color channel values 238 (corresponding to $X_i$), to a respective one of a plurality of output channel values 288.

Figure 5:
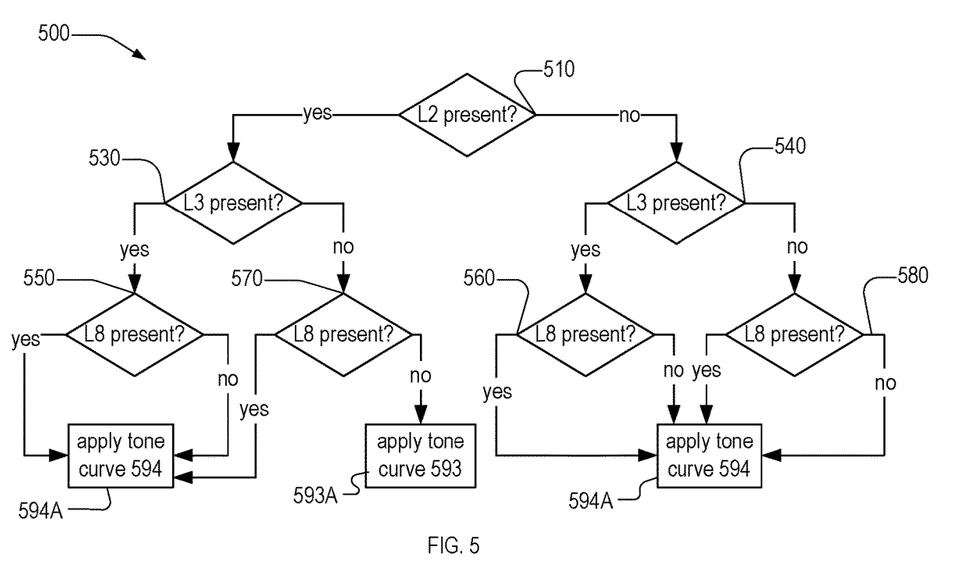
FIG. 5 is a graphical depiction a decision tree executed in an embodiment of the method of FIG. 4, in an embodiment.

When the decoder includes a plurality of tone curves corresponding to respective display management algorithms, step 450 may include a step 452, which is one of determining which of the plurality of tone curves to employ in the mapping step 450 based on metadata present in the video content. In an example of step 452, mapper 274 executes a decision tree 500, which may be stored in memory 260, for example, as part of mapper 274. Memory 210 of video encoder 200 may store decision tree 500 and transmit it, via communication channel 240, to video decoder 250. Decision tree 500 may be part of metadata 215.

As described earlier, any multi-parameter (e.g., SOP) optimization problem may be solved using a simpler two step approach. For example, one may first derive one of the three parameters (e.g., P) using a parametric model (e.g., see equation (4)) of the input metadata and then solve the MSE optimization problem (e.g., equations (2), (8), (10), and the like) for the other parameters (e.g., O and S).

FIG. 5 is a graphical depiction of decision tree 500. In the following example, decision tree 500 is implemented by mapper 274 to determine, based on metadata 215, which of second tone curve 264 and optimized tone curve 283 to employ when executing step 450 of method 400. Decision tree 500 includes decisions 510, 530, 540, 550, 560, 570, and 580. In decision 510, mapper 274 determines whether metadata 215 includes L2 metadata 215(2). In decisions 530 and 540, mapper 274 determines whether metadata 215 includes L3 metadata 215(3). In decisions 550, 560, 570, and 580, mapper 274 determines whether metadata 215 includes L8 metadata 215(8).

Decision tree 500 results in either action 593A or action 594A. Action 593A is one of employing a tone curve 593, of which tone curves 263 and 283 are examples. Action 594A is one of employing a tone curve 594, of which tone curves 214 and 264 are examples. In an example scenario, tone curve 593 is compatible with metadata L1 and L2, and second tone curve 594 is compatible with metadata L1, L3, and L8. Decision tree 500 results in action 594A except in the case the input metadata includes L2 metadata and includes neither L3 metadata nor L8 metadata. For example, unless metadata 215 includes metadata 215(2) and includes neither 215(3) nor 215(8), decision tree 500 results in action 594A.

Figure 6:
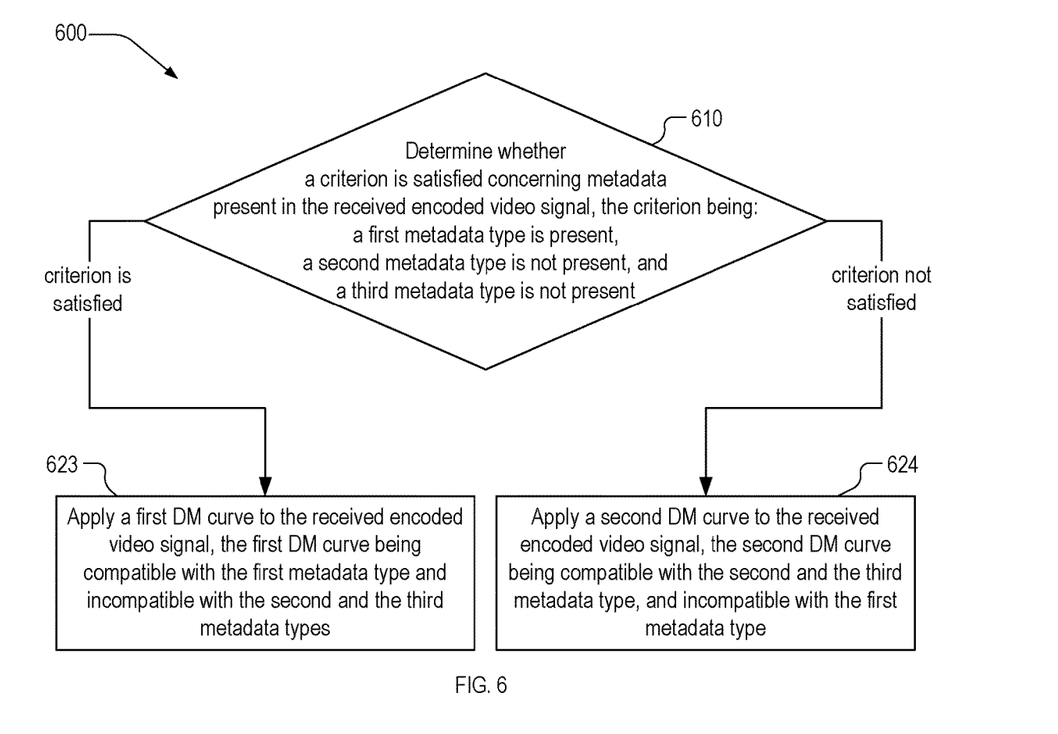
FIG. 6 is a method flowchart corresponding to the decision tree of FIG. 5, in an embodiment.

FIG. 6 is a flowchart illustrating a method 600 for determining which of a plurality of display management curves to apply to a received encoded video signal. Method 600 is, for example, implemented by a video decoder, such as video decoder 250, equipped to apply one of a first display management (DM) curve and a second DM curve to the received encoded video signal. Method 400 may implement method 600 as part of step 452.

Method 600 includes steps 610, 623, and 624. Step 610 is equivalent to a branch of decision tree 500 that starts with decision 510 and ends with one of decisions 550, 560, 570, and 580. Step 623 is equivalent to action 593A of decision tree 500. Step 624 is equivalent to action 594A of decision tree 500.

Step 610 is one of determining whether a criterion is satisfied concerning metadata present in the received encoded video signal. The criterion is satisfied when a first metadata type is present, a second metadata type is not present, and a third metadata type is not present. Metadata 215(2), 215(3), and 215(8), are examples of the first, second, and third metadata types, respectively. In an example of step 610, mapper 274 determines whether metadata 215 satisfies the criterion.

When the criterion is satisfied, method 600 proceeds to step 623, which is one of applying the first DM curve to the received encoded video signal, the first DM curve being compatible with the first metadata type and incompatible with the second and the third metadata types. In an example of step 623, mapper 274 applies optimized tone curve 283 to encoded video content 236, in which tone curve 283 is compatible with metadata 215(2) and incompatible with metadata 215(3) and metadata 215(8).

When the criterion is satisfied, method 600 proceeds to step 624, which is one of applying the second DM curve to the received encoded video signal, the second DM curve being compatible with the second and the third metadata type, and incompatible with the first metadata type. In an example of step 624, mapper 274 applies second tone curve 264 to encoded video content 236, in which second tone curve 264 is incompatible with metadata 215(2) and compatible with metadata 215(3) and metadata 215(8).

Figure 7:
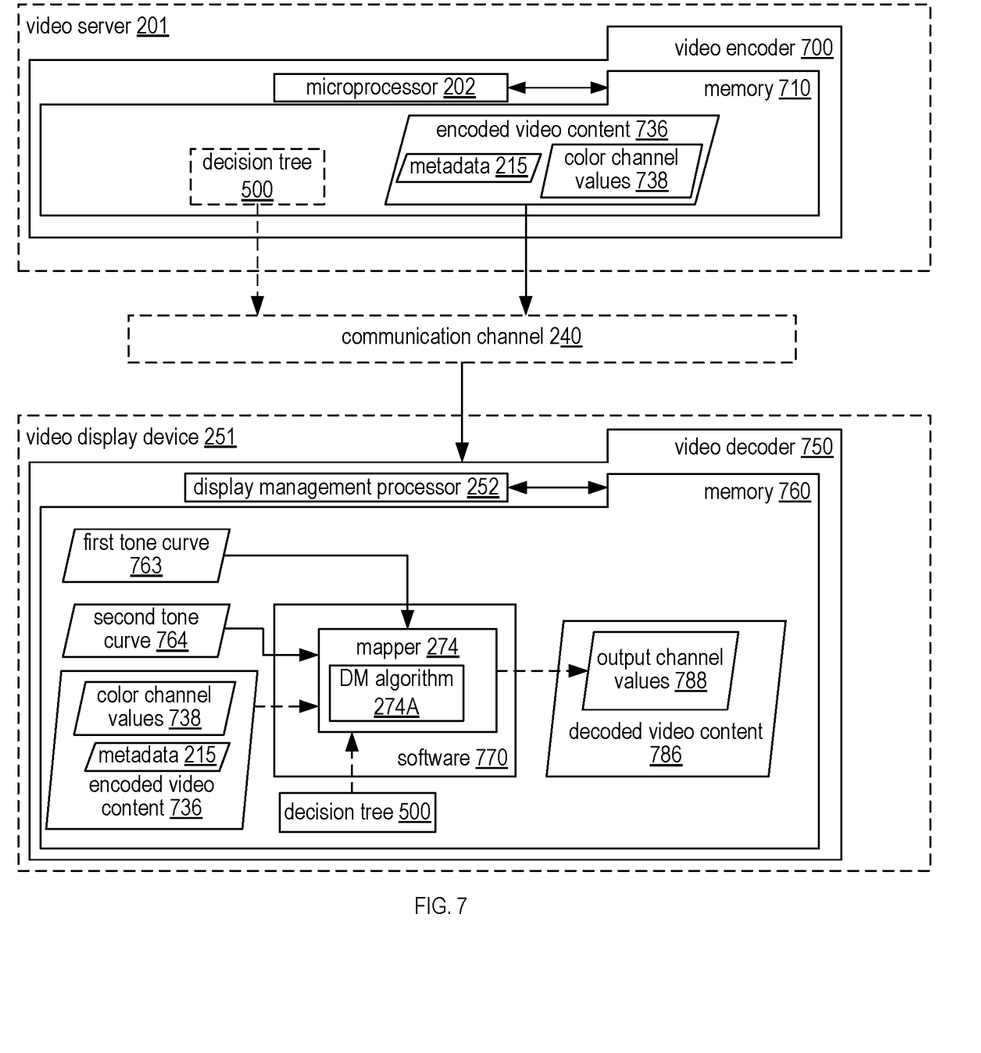
FIG. 7 is a schematic block diagram of a video encoder and a video decoder configured to implement the method of FIG. 6, in an embodiment.

FIG. 7 is a schematic block diagram of a video encoder 700 and a video decoder 750 in an example use scenario. Video encoder 700 and video decoder 750 are examples of video encoder 200 and video decoder 250, respectively. In this scenario, video encoder 700 is communicatively connected to video decoder 750, e.g., via communication channel 240. Video encoder 700 and video decoder 750 may be part of video server 201 and video display device 251, respectively. Video decoder 750 includes software 770 and may include functionality of display management unit 135.

Video encoder 700 includes microprocessor 202 communicatively coupled to a memory 710, which stores encoded video content 736 and also, in an embodiment, decision tree 500. Encoded video content 736 is an example of encoded video content 236, and includes metadata 215 and color channel values 738, which are examples of metadata 215 and color channel values 238, respectively.

Video decoder 750 includes display management processor 252 communicatively coupled to a memory 760, which stores a first tone curve 763, a second tone curve 764, and software 770, which includes mapper 274. Display management processor 252 performs functions of video decoder 750 described herein when executing machine-readable instructions of software 770. Memory 760 may also store decoded video content 786, which includes output channel values 788, which are examples of decoded video content 786 and output channel values 288, respectively.

Video decoder 750 is configured to receive encoded video content 736, for example, from a video encoder 700, and store encoded video content 736 in memory 760. Memory 760 stores decision tree 500, which video decoder may receive from video encoder 700.

One or more aspects of video decoder 750 may implement method 600 to generate output channel values 788. For example, method 600 is implemented in display management processor 252 executing computer-readable instructions of software 770.

In the above exemplary embodiments, the parameters of the trim-pass function are generated by the encoder, and the encoder includes the trim-pass parameters in the metadata of the encoded video bitstream for transmittal to the decoder. In another example, the parameters of the trim-pass function are generated by a bitstream convertor, which receives video content that already has been encoded by an encoder, generates the parameters of the trim-pass function as described above, and inserts the trim-pass function parameters in the metadata of the encoded video content, for examples by adding or replacing metadata of the bitstream.

Decoder-Based Optimization

As described earlier, given two tone curves, $g_{map}$, used in a decoder, and $f_{map}$, available at the encoder, in the encoder, one can automatically generate trims (e.g., Slope, Offset and Power) for the $g_{map}$ mapping at the decoder by minimizing an optimization function. In an embodiment, this approach can be represented as:

$$\min \sum_{i=1}^{n} \|f_{map}(X_i) - f_{trim}(g_{map}(X_i))\|^m, \qquad (12a)$$

or $$\min_{S,O,P} \sum_{i=1}^{n} \|f_{map}(X_i) - (S * (g_{map}(X_i)) + O)^P\|^m, \qquad (12b)$$

where n denotes the total number of test images used for deriving the optimized S, O, and P values, and m>0, e.g. m=1 or m=2. Note that multiplication (e.g., "*") in equation (12) is in vector space. By minimizing equation (12b), one can generate trim-pass S, O and P values that can be communicated to a decoder through the bit-stream so that the decoder can apply these trim pass values to the output of the legacy tone curve $g_{map}$ to get values as close as possible to the desired $f_{map}$ mapping. At the encoder side, this problem can be solved using the least squares approach or the Levelberg-Marquart algorithm or any other minimization technique known in the art.

In another embodiment, the decoder may be using an updated $g_{map}$ curve; however, it may receive input image and trim-pass data generated based upon the legacy curve $f_{map}$. The problem is then how to enable the decoder to reconstruct the original look despite having a different display mapping function. An obvious way to address such a scenario is to a) regrade all the $f_{map}$-based content and generate trims using the $g_{map}$ tone curve, and b) transmit the new trims; however, this is an expensive process and might not be feasible.

In one embodiment, the original $f_{map}$-trims may be modified using the following mapping approach: Let's assume that both $f_{map}$ and $g_{map}$ are known at the encoder and that trim values for $f_{map}$ are known. Given L1 metadata (e.g., Min, Mid, and Max luminance) one may build a series of gray pixels from L1 Min to L1 Max and map them using $f_{map}$. Then, assuming a $g_{map}$ mapping, one may apply and test for different transformed trim pass values within the permissible ranges in $g_{map}$. Finally, one may pick the transformed trim-pass values that yield the closest match to the mapped gray pixels, and then transmit those values through the encoder. Such an approach assumes that the trim-pass metadata may be modified before transmitting them; however, this may not be true for cases when one has existing content with metadata (e.g., L2 metadata) using a legacy tone curve $f_{map}$ and the devices/decoders have been upgraded to using the new tone curve $g_{map}$.

Another potential solution is to implement the optimization techniques described earlier in the decoder instead of in the encoder and generate in the decoder trims corresponding to $g_{map}$; however, this solution may not be feasible due to computation constrains in a decoder. For example, implementing an iterative optimization technique in the decoder might impede real-time performance. To solve this problem, a linear regression-based model is proposed to translate in a decoder the trims generated using one tone curve, say $f_{map}$ into trims for another tone curve, say $g_{map}$.

Assuming, without loss of generality, a linear trim-data transformation model, the goal is to find the right global scalars and offsets for the trims generated using $f_{map}$ so that when those modified trims are applied to the output of $g_{map}$, the output looks as close as possible to the output of the $f_{map}$ tone curve. These global scalars and offsets can then be built into the decoder and can be used to translate the trims from one tone curve to another.

Mathematically, let's assume that the trims that have been generated for a legacy tone curve for some content are S, O and P and the final tone curves are as follows:

$$f_{trim}(f_{map}(X_i)) = (S * f_{map}(X_i) + O)^P. \quad (13)$$

In an embodiment, new trims S', O' and P' need to be generated for the same content using a new tone curve $g_{map}$ which can be shown as $$g_{trim}(g_{map}(X_i)) = (S' * g_{map}(X_i) + O')^{P'}, \quad (14)$$

such that the outputs from both the tone curves are as close as possible, that is, $$f_{trim}(f_{map}(X_i)) \approx g_{trim}(g_{map}(X_i)).$$

Without limitation, in an embodiment, it is assumed that the new trims (S' O' P') may be represented as a linear transformation of the original trims (S O P), that is:

$$T' = \alpha T + \beta, \quad (15)$$

where, $$T' = \begin{pmatrix} S' \\ O' \\ P' \end{pmatrix}, T = \begin{pmatrix} S \\ O \\ P \end{pmatrix},$$

and $$\alpha = \begin{pmatrix} \alpha_1 \\ \alpha_2 \\ \alpha_3 \end{pmatrix}, \beta = \begin{pmatrix} \beta_1 \\ \beta_2 \\ \beta_3 \end{pmatrix}.$$

A person with ordinary skill in the art will appreciate that while equation (15) represents a linear trim-transformation model, which simplifies the computations, in other embodiments, T' values may be represented using a non-linear model, say a quadratic model, a cubic model, and the like.

Using a least squares-estimation technique, or the Levelberg-Marquart algorithm, or any other technique, one can estimate the values of $\alpha$ and $\beta$. These scalars and offsets can then be sent to the decoder and in turn can be used to translate trims from one tone curve to trims for another tone curve.

Note that the least squares estimation should be applied in such a way that one takes into consideration sample points across the entire input range of the tone curves. Using, without limitation, an optimization criterion to minimize the sum of squared differences between the outputs of equations (13) and (14), the problem to be solved may be expressed as solving for:

$$\min_{\alpha,\beta} \Sigma_i \| f_{trim}(f_{map}(X_i)) - g_{trim}(g_{map}(X_i)) \|^2. \quad (16)$$

The process discussed above may be summarized as follows: In an encoder,
- determine a legacy display management process tone curve ($f_{map}$)
- determine a modified display management process tone curve ($g_{map}$)
- Using a linear trim-transformation model (see equation (15)), generate modifying scalars $\alpha$ and offsets $\beta$ pertaining to modifying trim-pass metadata (e.g., slope, offset and power) by minimizing equation (16)
- communicate the modifying scalars and offsets to the decoder Alternatively, one may map a series of gray pixels with $f_{map}$; identify the best trim pass values pertaining to $g_{map}$ that yield the closest image values to the mapped gray pixels and transmit the new trim values.

In a decoding/playback stage (e.g., in a television, mobile device, or any other display device):
- read the trim pass values from the bitstream metadata (e.g., L2 metadata)
- modify the received trim pass values using the modifying scalars and offsets ($\alpha$ and $\beta$) to generate modified trim-pass metadata
- generate a display management process tone curve using the tone curve module ($g_{map}$)
- apply the modified trim-pass metadata to the output of the display management process to generate the final output The proposed techniques may be applicable to other types of metadata, e.g., metadata related to HDR+ or HDR10+ metadata. For example, if content comes with HDR10+ metadata (that might include trim values, for say, a 350 nit P3 display), this invention can be used to automatically generate different levels of metadata (say L2 or L8 Dolby Vision metadata) for the 350 nit P3 display while automatically optimizing them to match the HDR10+ trims. One may also apply this invention to automatically generate trims for an HDR10+ use case, for example for a 350 nit P3 display, given Dolby Vision content with or without trims (e.g., L2 or L8 metadata). In addition to modifying intensity-based trims, one can also use a similar process to modify metadata related to color-based trims across different version of tone curves. In such a scenario, $f_{map}(\ )$ represents the tone curve used to generate the HDR10 stream and $g_{map}(\ )$ represents the tone curve used by a Dolby Vision decoder. Given an HDR10 signal, it is desired to generate metadata so that a Dolby Vision decoder will match the intended HDR10 look.

Other example embodiments where the methods of this invention are applicable include the following scenarios:

a) Let $f_{map}(\ )$ denote a new target tone curve and let $g_{map}(\ )$ denote a legacy decoder tone curve. It is desired that the old decoders be able to match the new look, as produced by $f_{map}(\ )$. As new content is generated (using $f_{map}(\ )$), it is desired to generate new metadata which when read by the old decoder, it will reproduce the video content as if it was generated using the new target tone curve. In this scenario new metadata (e.g., L8) is translated to old metadata (e.g., L2).

b) Let $f_{map}(\ )$ denote an old target tone curve (e.g., one used to generate content in the past) and let $g_{map}(\ )$ denote the latest decoder tone curve in a new generation of decoders. It is desired that new decoders be able to match the old look, as produced by $f_{map}(\ )$. In this scenario, old metadata (e.g., L2) is translated to new metadata (e.g., L8). In all these use cases, the goal is to generate SOP parameters in $f_{trim}(\ )$ so that the output of $f_{trim}(g_{map}(X_i))$ is as close as possible to $f_{map}(X_i)$.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

The invention claimed is:

1. An encoder method to generate trim-pass transformation parameters, the method comprising:
   accessing a first tone-mapping curve;
   accessing a second tone-mapping curve;
   accessing a set of input image data and a set of corresponding input trim-pass data defining a first trim-pass function adapted for color grading the set of input image data after application of the first tone-mapping curve; and
   determining parameters for a trim-pass transformation model for translating said input trim-pass data to trim-pass data for defining a second trim-pass function adapted for color grading the set of input image data after application of the second tone-mapping curve, said determining comprising minimizing a difference between:
      a first set of image outputs generated by processing the set of input image data by applying the first tone-mapping curve and the first trim-pass function defined by the input trim-pass data, and
      a second set of image outputs generated by transforming the input trim-pass data to output trim-pass data using the trim-pass transformation model and processing the set of input images by applying the second tone-mapping curve and the second trim pass function defined by the output trim-pass data,
   wherein the difference minimization is constrained such that the first tone-mapping curve and the second trim-pass function have equal minimum and maximum values at an input channel.

2. The method of claim 1, further comprising transmitting the parameters for the trim-pass transformation model to a decoder together with the input image data and the input trim-pass data.

3. The method of claim 1, wherein the trim-pass transformation model is a linear model.

4. The method of claim 1, wherein the input trim-pass data comprise slope (S), offset (O), and power (P) data.

5. The method of claim 1, wherein said minimizing comprises: minimizing a sum of square differences between the first and second sets of image outputs.

6. A decoder method to process input video data, the method comprising:
   accessing input video data and corresponding input trim-pass data defining a first trim-pass function adapted for color grading input video data after application of a first tone-mapping curve;
   accessing trim-pass transformation parameters for a trim-pass transformation model to translate the input trim-pass data to trim-pass data defining a second trim-pass function adapted for color grading input video data after application of a second tone-mapping curve, wherein the trim-pass transformation model is a linear transformation model, wherein the trim-pass transformation parameters minimize a sum of squared differences between the first trim-pass function and the second trim-pass function, and wherein the difference minimization is constrained such that the first tone-mapping curve and the second trim-pass function have equal minimum and maximum values at an input channel;
   translating the input trim-pass data to transformed trim-pass data by applying the trim-pass transformation model in accordance with the trim-pass transformation parameters to the input trim-pass data; and
   generating output video data by applying the second trim-pass function defined by the transformed trim-pass data and the second tone mapping curve to the input video data.

7. The method of claim 6, wherein input trim-pass data comprise HDR10+ metadata and the transformed trim-pass data curve comprise Dolby Vision metadata.

8. The method of claim 6, wherein input trim-pass data comprise Dolby Vision metadata and the transformed trim-pass data comprise HDR10+ metadata.

* * * * *